March 9, 1948. H. R. GREENLEE 2,437,517
TRANSMISSION
Filed Dec. 18, 1944
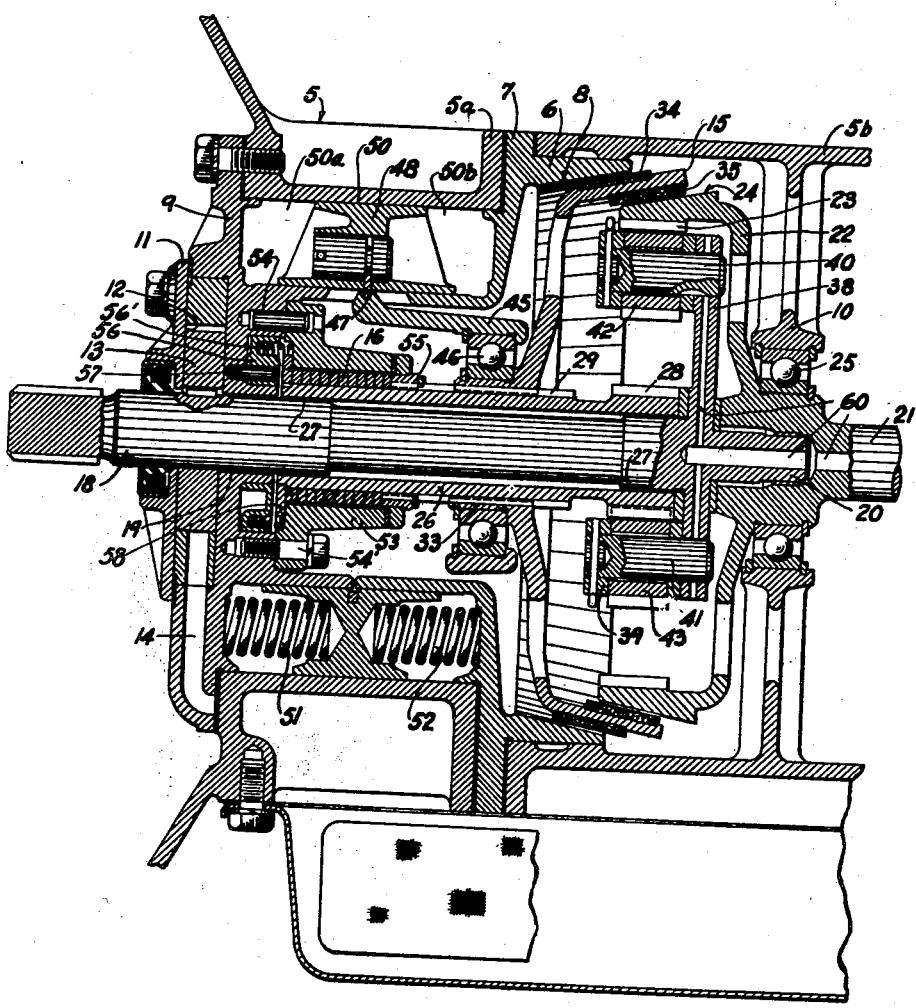
INVENTOR.
BY Harry R. Greenlee
Brown, Jackson, Boettcher & Dienner
ATTORNEYS Patented Mar. 9, 1948

2,437,517

UNITED STATES PATENT OFFICE 2,437,517

TRANSMISSION

Harry R. Greenlee, Indianapolis, Ind., assignor to The Studebaker Corporation, South Bend, Ind., a corporation of Delaware Application December 18, 1944, Serial No. 568,593

5 Claims. (Cl. 74—290)

This invention relates, in general, to transmissions, and has particular reference to an improved automotive transmission having a torque transmitting member shiftable to different positions and in which this member, in one position, is locked against rotation to provide a ratio drive through the transmission, and, in another position, has driving relation relative to another torque transmitting member for direct or one-to-one drive through the transmission.

While the particular device which I shall describe hereinafter in connection with the drawing employs planetary gearing to provide ratio drive between the drive and driven shafts of the transmission, it is to be understood that the present invention is not limited to the particular form of device shown and described; also that the invention may be used in various automotive vehicles as suitable and desired.

One of the main objects of the present invention is to provide an improved form of transmission of the class described in which there will be a means for breaking the drive line at will (of the type of transmission which is shiftable under torque load without breaking the drive line) for a sufficient period of time that the device's own clutch may be used, in either direction, as a master clutch, after which the free wheeling member is reinstated and the unit may again function as a transmission shiftable under torque load without breaking the drive line.

Another object of the invention is to provide an improved form of transmission of the class described that may be made small and compact without the necessity of using a master clutch ahead of the mechanism.

Another object of the invention is to provide an improved form of transmission of the class described in which the shiftable torque transmitting member is engaged, prior to energizing the spring brake and before locking same against rotation, softly and without chatter or jerking.

Another object of the invention is to provide a transmission having various features of novelty and advantages, and which is particularly characterized by its simplicity in construction, its lightness in weight, its compactness and adaptability for use where the space is restricted, its economy in manufacture, and its effectiveness in use, due to the elimination of a conventional master clutch.

Another and more specific object of the invention is to provide a combined helical spring or L. G. S. brake, and an outer cone brake member fixed, for example, to the housing of the transmission for locking the shiftable torque transmitting member against rotation; also for means for bringing the helical spring brake into action after the outer cone brake member has ceased to rotate.

Another object of the invention is to provide the engagement of the shiftable cone member with the ring gear before engaging the spring brake for direct drive.

Further objects and advantages of the invention will appear from the following detailed description, taken in connection with the accompanying drawing in which the single figure illustrates the manner of constructing and operating one form of transmission embodying the present invention.

With reference now to the drawing, in the particular embodiment of the invention selected for illustration, 5 designates the transmission housing between contiguous sections 5a and 5b, of which a cone brake member 6 is fixedly secured, for example, at 7. The cone brake member 6 has an internal cone brake surface 8.

The housing 5 has an end closure plate at 9 and a bearing support at 10. The space between the plate 9 and a cylinder block or plate 11 forms a pump cylinder 12 within which a rotary pump member 13 operates to supply fluid under pressure through a duct 14 and further ducts (not shown) to operate the shiftable torque transmitting member 15 and the helical spring brake 16, as will hereinafter appear.

The drive shaft 18 enters the housing 5 through an opening 19, and is piloted at 20 in the adjacent end of the driven shaft 21. Formed integral with the driven shaft 21 is a torque transmitting member 22 having an internal ring gear 23 and an external cone clutch surface 24. The driven shaft 21 is journaled in a bearing 25 carried by the housing 5.

A sleeve 26 is journaled on the drive shaft 18, for example, by bushings 27. The sleeve 26 has a sun gear 28 and external longitudinal splines 29. A bushing may be provided where the drive shaft 18 is journaled in the closure plate 9 of the housing 5.

A second torque transmitting member 15 is fixed against turning movement relative to the sun gear 28 by splined engagement at 33 with the splines 29 on the sleeve 26. The splined engagement at 33 permits axial shifting movement of the member 15 along the sleeve 26 and relative to the sun gear 28. The torque transmitting member 15 has an external cone brake surface 34 for engagement with the cone brake surface 8 of the fixed cone brake member 6, and an internal cone clutch surface 35 for engagement with the cone clutch surface 24 of the ring gear 23. The cone brake surfaces 34 and 35 are preferably formed of suitable friction material as shown in the drawing.

A planetary arm 38 is formed integral with the drive shaft 18, which, with the part 39, carries planet pins 40 and 41. Planet pinions 42 are rotatably mounted on the planet pins 40 (only one of which is shown to simplify the illustration) and mesh with the ring gear 23. Planet pinions 43 are rotatably mounted on the planet pins 41 (only one of which is shown). The planet pinions 43 mesh with the pinions 42 and with the sun gear 28, as well understood in the art. Other forms of planetary or epicyclic gearing may, of course, be employed between the drive and driven shafts of the transmission, within the scope of the present invention.

The torque transmitting member 15 is shifted axially or longitudinally along its splined connection with the sleeve 26 by a shifter arm 45 held or connected to the member 15, for example, by a bearing 46 and suitable retainer rings. At its opposite end the arm 45 is connected at 47 to a piston 48 which is shown of annular form and operates within an annular cylinder 50. The cylinder 50 has connections (not shown) between its cylinder spaces 50a and 50b at opposite ends of the piston 48 and the oil or other liquid or fluid system through which fluid pressure is introduced from the liquid or fluid system, which includes the duct 14, selectively into the cylinder spaces 50a and 50b. The piston 48 may be normally centered, for example, by coiled springs 51 and 52.

A collar 53 is fixed to the housing 5, for example, by dowel pin 54 and screw 54', and surrounds the sleeve 26; there being an annular space between the collar 53 and the sleeve 26. The convolutions of the helical spring brake 16 surround the sleeve 26 and are disposed within the collar 53. One end of the spring 16 is fixed to the sleeve 26, for example, by splined engagement of an end extension thereof with the splines 29 at 55. At its opposite end the helical spring brake 16 is provided with a piston 56 which is held against rotation by a pin 57 and is operable to actuate the helical spring brake 16 to cause the same to expand radially into braking engagement with the collar 53.

The piston 56 has a piston spring 56' for retracting or releasing the energizing washer 58 from engagement with collar 53. Energizing washer 58 is in constant engagement with the toe end of spring 16. In the inoperative position of piston 56 the energizing washer 58 is free to rotate with the spring 16 and sleeve 26. When the piston 56 is in operative position it engages energizing washer 58 with the collar 53 to attempt to retard any rotation of energizing washer 58. Due to the right hand helix of spring 16, if the sleeve 26 is revolving the same direction as the drive shaft 18, then the attempted retarding of energizing washer 58 merely acts to wind the spring down tighter on sleeve 26. If the sleeve 26 attempts to rotate in the opposite direction of the drive shaft 18, then the attempted retarding of energizing washer 58 causes the forward end of spring 16 to expand out against the cylinder of collar 53. The piston 56 may be actuated in any suitable or preferred manner; for example, by application of fluid pressure from the fluid system, which includes the duct 14, against the piston.

The transmission operates, in general, as follows:

If the engine or other source of power is operating to turn the drive shaft 18, and the torque transmitting member 15 is in its intermediate position out of braking engagement with the members 6 and 22, the device is in neutral.

Ratio or underdrive is imparted from the drive shaft 18 to the driven shaft 21 by admitting fluid under pressure into the cylinder space 50b. This moves the torque transmitting member 15 to the left as the device is viewed in the drawing, through the shifter arm 45 to bring the cone brake surface 34 of the member 15 into braking engagement with the cone brake surface 8 of the fixed cone brake member 6. As the torque transmitting member 15 grabs and holds to the member 6 to lock the sun gear 28 against rotation, a suitable control (not shown) is manipulated to admit fluid pressure against the piston for the helical spring brake 16. Due to the right hand helix of spring 16, if the sleeve 26 is revolving the same direction as the drive shaft 18, then the attempted retarding of energizing washer 58 merely acts to wind the spring down tighter on sleeve 26. If the sleeve 26 attempts to rotate in the opposite direction of the drive shaft 18, then the attempted retarding of energizing washer 58 causes the forward end of spring 16 to expand out against the cylinder of collar 53.

In operation, the cone brake surfaces 34 and 8 are preferably engaged first, and as the cone brake surfaces take hold the helical spring brake 16 is actuated to complete and make positive the locking of the torque transmitting member 15 and thereby the sun gear 28 against rotation. The cone brake surfaces and the helical spring brake operate conjointly to lock the torque transmitting member 15 and thereby the sun gear 28 against rotation, only if torque is sufficient to slip the surfaces 34 and 8 in the opposite direction of that of input shaft 18.

Upon locking the torque transmitting member 15, and thereby the sun gear 28, against rotation in either direction, a ratio drive is imparted to the driven shaft 21 in either direction through the operation of the planetary gearing about the sun gear 28.

When direct or one-to-one ratio is desired, the pressure in the cylinder space 50b is released, and fluid under pressure is admitted into the cylinder space 50a. This moves the torque transmitting member 15 to the right to bring the cone clutch surface 35 into clutching engagement with the cone clutch surface 24 of the member 22. With the members 15 and 22 thus engaged, these members are locked together to provide direct or one-to-one drive from the drive shaft 18 to the driven shaft 21. As the member 15 moves to engage member 22, the spring brake 16 remains expanded outward into the cylinder of collar 53 thus preventing sleeve 26 from momentarily revolving in the opposite direction of drive shaft 18 and permitting the shift to be completed without breaking the drive line.

The drive shaft 18, planetary arm 38 and driven shaft 21 are shown provided with lubricant passages 60, but this may, of course, vary widely within the scope of the present invention.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. In a transmission having a transmission housing, gear means in said transmission housing, and drive and driven shafts having connection with said gear means, the combination of first brake means comprising a brake member fixed to said housing and having a cone brake surface, and a torque transmitting member associated with said gear means having a cone brake surface adapted to have frictional engagement with the cone brake surface of said brake member to provide drive between said drive and driven shafts through said gear means, second brake means comprising a collar member fixed to said transmission housing having a braking surface, an annular coil spring brake member disposed in said collar member and arranged in fixed relation at one end with said gear means, and means associated with the other end of said spring brake member for selectively restraining the latter against rotation or freeing the same for rotation, said spring brake member when restrained against rotation being adapted to be expanded radially into engagement with said braking surface of said collar member to maintain said drive between said drive and driven shafts upon slippage of the cone braking surfaces of said brake member and said torque transmitting member when engaged or upon disengagement thereof.

2. In a transmission having a transmission housing, a planetary gear mechanism within said housing comprising three elements, namely a sun gear, planet pinion means, and a ring gear, a drive shaft connected to one of said elements, and a driven shaft connected to a second of said elements the combination of first brake means comprising a brake member fixed to said housing and having a cone brake surface, and a torque transmitting member associated with the third of said elements of said planetary gear mechanism having a cone brake surface adapted to have frictional engagement with the cone brake surface of said brake member to provide a drive between said drive and driven shafts through said planetary gear mechanism, second brake means comprising a collar member fixed to said transmission housing having a braking surface, and an annular coil spring brake member associated with said collar and fixed at one end to said third element of said planetary gear mechanism, and means for selectively restraining the other end of said spring brake member against rotation or freeing the same for rotation with said third element of said planetary gear mechanism, said spring brake member when the free end thereof is restrained against rotation being adapted to be expanded radially into engagement with the braking surface of said collar member to maintain said drive between said drive and driven shafts upon slippage of the cone braking surfaces of said brake member and said torque transmitting member when engaged, or upon disengagement thereof.

3. In a transmission having a transmission housing, a planetary gear mechanism within said housing comprising a sun gear, planet pinion means, and a ring gear, a drive shaft having connection with said planet pinion means, and a driven shaft having connection with said ring gear, the combination of first brake means comprising a brake member fixed to said housing and having a cone brake surface, and a torque transmitting member associated with said sun gear having a cone brake surface adapted to have frictional engagement with the cone brake surface of said brake member to restrain said sun gear against rotation and provide drive between said drive and driven shafts through said planetary gear mechanism, second brake means comprising a collar member fixed to said transmission housing and having a braking surface, and an annular coil spring brake member associated with said collar and fixed at one end with said sun gear, and means for selectively restraining the other end of said spring brake member or for freeing the latter for rotation with said sun gear, said spring brake member when the free end thereof is restrained against rotation being adapted to be expanded radially into engagement with the braking surface of said collar member to restrain rotation of said sun gear upon slippage of the cone braking surfaces of said brake member and said torque transmitting member when engaged, or upon disengagement thereof.

4. In a transmission having a transmission housing, a planetary gear mechanism within said housing comprising a sun gear, planet pinion means, and a ring gear, a drive shaft having connection with said planet pinion means, and a driven shaft having connection with said ring gear, the combination of first brake means comprising a brake member fixed to said housing and having a cone brake surface, and a torque transmitting member associated with said sun gear having a cone brake surface adapted to have frictional engagement with the cone brake surface of said brake member to restrain said sun gear against rotation and provide drive between said drive and driven shafts through said planetary gear mechanism, second brake means comprising a collar member fixed to said transmission housing and having a braking surface, and an annular coil spring brake member associated with said collar and fixed at one end with said sun gear, fluid pressure responsive means adapted upon the admission of fluid under pressure therein for engaging the other end of spring brake member for restraining the latter against rotation, said spring brake member when the free end thereof is restrained against rotation being adapted to be expanded radially into engagement with the braking surface of said collar member to restrain rotation of said sun gear upon slippage of the cone braking surfaces of said brake member and said torque transmitting member when engaged, or upon disengagement thereof.

5. In a transmission having a transmission housing, a planetary gear mechanism within said housing comprising a sun gear, planet pinion means, and a ring gear, a drive shaft having connection with said planet pinion means, and a driven shaft having connection with said ring gear, the combination of first brake means comprising a brake member fixed to said housing and having a cone brake surface, and a torque transmitting member associated with said sun gear having a cone brake surface adapted to have frictional engagement with the cone brake surface of said brake member to restrain said sun gear against rotation and provide drive between said drive and driven shafts through said planetary gear mechanism, second brake means comprising a collar member fixed to said transmission housing and having a braking surface, and an annular coil spring brake member associated with said collar and fixed at one end with said sun gear, fluid pressure responsive means comprising a cylinder formed between said collar member and said transmission housing adjacent the other end of said spring brake member, a piston movably axially in said cylinder toward and away from said other end of said spring brake member, and spring means between said collar and piston for normally biasing said piston away from said other end of said spring brake member, means for restraining rotation of said piston relative to said housing, said piston being adapted to be moved by fluid under pressure toward said spring brake member against the force of said biasing spring means to engage said other end of said spring brake member to restrain the latter against rotation, said spring brake member when the free end thereof is restrained against rotation being adapted to be expanded radially into engagement with the braking surface of said collar member to restrain rotation of said sun gear upon slippage of said cone braking surfaces of said brake member and said torque transmitting member when engaged, or upon disengagement thereof.

HARRY R. GREENLEE.

REFERENCES CITED

The following references are of record in the file of this patent:

UNITED STATES PATENTS

| Number | Name | Date |
| --- | --- | --- |
| 2,034,087 | Chilton | Mar. 17, 1936 |
| 2,318,481 | Greenlee | May 4, 1943 |

FOREIGN PATENTS

| Number | Country | Date |
| --- | --- | --- |
| 456,007 | Great Britain | Nov. 2, 1936 |
| 477,530 | Great Britain | Jan. 3, 1938 |